Figure 1:
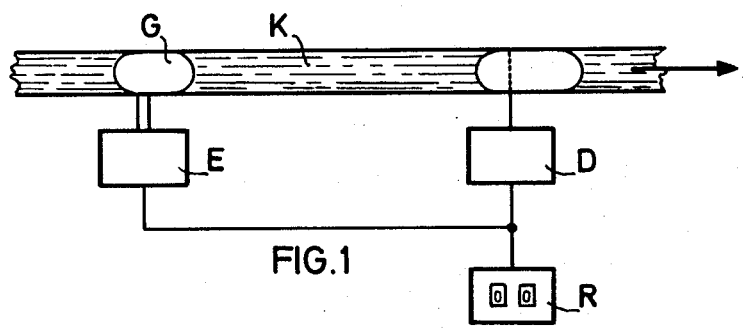

United States Patent [19]

Hellström

[11] 3,815,414

[45] June 11, 1974

[54] METHOD OF INCREASING THE MEASURING RESOLUTION OF A FLOW MEASURING INSTRUMENT WHERE THE FLOW IS DIVIDED INTO SECTIONS OF WELL DEFINED VOLUME

[76] Inventor: Karl Bertil Hellström, Appollanagen 17, 170 24 Skalby, Sweden

[22] Filed: Apr. 25, 1972

[21] Appl. No.: 247,461

[30] Foreign Application Priority Data
   May 5, 1971  Sweden .............................. 5846/71

[52] U.S. Cl. ............................................. 73/194 E
[51] Int. Cl. ............................................. G01f 1/00
[58] Field of Search ...... 73/194 E, 1 R, 204, 194 R; 324/189

[56] References Cited
   UNITED STATES PATENTS
   3,403,554  10/1968  Chevalier et al. ................. 73/194 E
   3,621,715  11/1971  Söderkvist et al. ................ 73/194 E Primary Examiner—Richard C. Queisser
Assistant Examiner—Stephen A. Kreitman

[57] ABSTRACT

The resolution of a device, which measures the flow of liquid in a tube by producing a series of signals each of which corresponds to the passage through the tube of a predetermined volume of liquid, is increased by the introduction of additional signals at a rate which is a predetermined multiple of the basic signals and utilizing these additional signals, coordinated with the basic signals, to indicate the passage through the tube of fractional amounts of the volume measured by each of the basic signals.

3 Claims, 3 Drawing Figures

METHOD OF INCREASING THE MEASURING RESOLUTION OF A FLOW MEASURING INSTRUMENT WHERE THE FLOW IS DIVIDED INTO SECTIONS OF WELL DEFINED VOLUME

The present invention refers to a method of increasing the measuring resolution of a flow measuring instrument where the flow is divided into sections of well defined volume, the number of said sections constituting a measure of the flow passing through the instrument, each passing section giving rise to an indication signal.

In laboratories, chemical process industries and similar institutions there is often a need for determining the flow volume of small liquid flows of low velocity at a high accuracy. Such determinations could be performed by passing the flow through a tube where bubbles are injected into the flow by means of a gas pump. This pump is then controlled by a gas liquid detector, arranged downstream the gas pump at a well defined distance from the pump, the detector being capable of indicating the presence of gas or liquid in the tube. This detector activates the pump to introduce a new gas bubble in the flow of the tube each time a bubble is detected by the detector. The apparatus further comprises a counter for counting the number of gas bubbles injected into the flow or a clock for measuring the time interval between the bubbles. The result obtained in the counter will then constitute a measure of the flow volume of the liquid flow and the indicated time interval will represent the velocity of the flow. The advantage of such an apparatus is that the result is independent of the velocity of the flow as well as the viscosity, surface tension and specific density of the fluid. Furthermore no intermixing of different sections of the flow will be obtained. The principle further permits a very high measuring accuracy if the diameter of the tube is small and the distance between the gas bubbles is well defined. Thus the measuring accuracy of an instrument according to this principle, as described e.g., in the Swedish Pat. application 10857/68, now U.S. Pat. No. 3,621,715, could be made higher than 1 $\mu$l. The drawback is however, that even if the measuring accuracy could be made very high, i.e., the fluid volume between two gas bubbles could be very well defined, the resolution of the instrument cannot be increased to a corresponding extent, i.e., the distance between subsequent bubbles could not be made arbitrary small.

Figure 2:
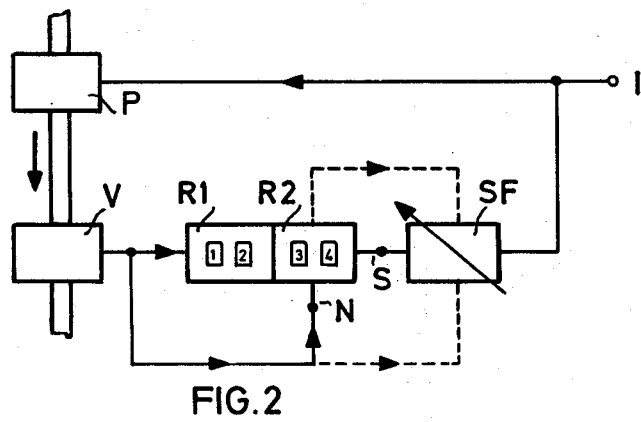
Figure 3:
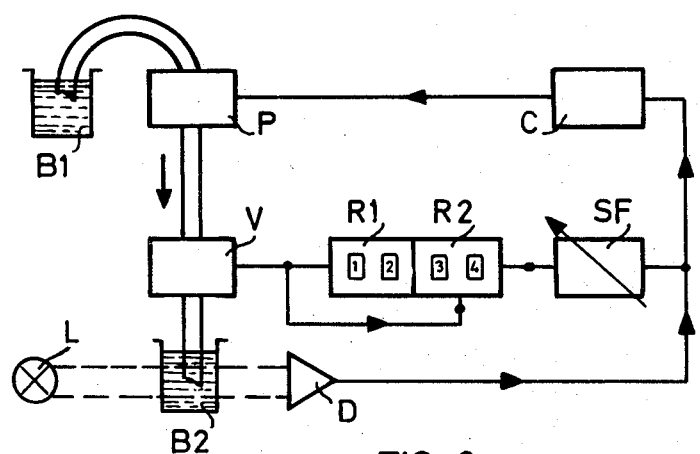

It is an object of the present invention to provide a method of increasing the measuring resolution of a flow measuring instrument of the above described type. The invention will now be described in detail, reference being made to the enclosed drawing in which:

FIG. 1 schematically shows a flow meter of the above described type;

FIG. 2 schematically shows an apparatus for carrying out the method according to the invention; and FIG. 3 shows an apparatus according to FIG. 2 used in an automatic titration device.

The prior art apparatus of FIG. 1 comprises a capillary tube K through which liquid is flowing in direction as indicated by the arrow. The capillary tube is provided with a detector D, capable of detecting whether gas or liquid is present in the capillary at the detector, and a pump E from which gas bubbles G could be injected into the liquid flow. The pump E is controlled by the detector D so as to inject a bubble in the flow when a bubble passes the detector. The detector D also controls a counter R, this counter thus indicating the number of bubbles passing the detector. If the tube volume between the pump E and the detector D is well defined the number indicated in the counter will form a measure of the flow that has passed the detector D. The fluid volume between two bubbles could be determined with a very high accuracy (in the order of 1 $\mu$l) whereas the volume could not be reduced to a corresponding extent. The measuring accuracy will thus be much higher than the resolution of the instrument.

Referring now to FIG. 2 there is shown an apparatus for carrying out the method according to the invention. In FIG. 2 reference V denotes a flow meter as described in FIG. 1. The flow meter is equipped with a counter R1, activated by the flow meter as described in connection with FIG. 1. The apparatus according to FIG. 2 further comprises a device P by means of which the flow through the flow meter V is controlled. The device P might consist of a controlled pump or valve. The device P is controlled from a control signal input I and is designed so as to supply to the meter an amount of liquid per unit of time that is determined by the control signal. The control signal is also supplied to a trigger input S of a second counter R2 via an interfacing circuit SF. The purpose of the interfacing circuit is to generate pulses of a frequency corresponding to the liquid flow passing through the device P, which for instance might consist of a pump, this flow being related to the control signal. If for instance the control signal is formed by an analogous signal the amplitude of which determines the capacity of the pump P, the interfacing circuit consists of an amplitude to pulse frequency converter, generating trigger pulses of a frequency corresponding to the amplitude. If the control signal is formed by a pulse train, the pulses of which control a stepmotor in the pump P, the interfacing circuit might instead consist of a pulsefrequency converter. If an output signal is obtained from the flow meter V when 100 $\mu$l has passed through the meter (i.e., gas bubbles are injected at this interval) and the counter R2 comprises two digital positions, the interfacing circuit could be adjusted so as to generate 100 trigger pulses to the counter R2 for each pulse from the flow meter. The resolution of the apparatus will then be 1 $\mu$l. In order to prevent that an erroneous adjustment of the interfacing circuit gives rise to an accumulated error in the counter R2, this counter is set to zero by the output pulses from the flow meter via a zero adjustment input N. If the value of the counter R2 differs from zero when the pulse is obtained from the flow meter, the adjustment of the interfacing circuit should be changed. This could be done manually or automatically by using the value of the counter R2 at the moment when the pulse is obtained from the flow meter for changing the adjustment of the interfacing circuit as indicated by the broken lines in FIG. 2. By using the signal from the flow meter V, which has a high measuring accuracy, for changing the adjustment of the counter R2 and the interfacing circuit SF one could thus obtain a high resolution without requirements for long time stability or high accuracy of the unit P. The interfacing circuit could of course also be connected between the input I and the unit P.

In FIG. 3 there is shown an apparatus according to FIG. 2 used in an automatic titration system. The system of FIG. 3 comprises in addition to the unit of FIG. 2 a vessel B1 from which liquid passes through the pump or valve P and the flow meter V to a second vessel B2 containing the second liquid used at the titration. The colour of the contents of the vessel B2 is detected by means of a detector D and a lamp L, the detector D generating an analogous signal having an amplitude which indicates how much further liquid that is to be added for completing the titration. The interfacing circuit thus consists of an amplitude to pulsefrequency converter which is adjusted in accordance with what have been described above. The pump or valve P is controlled by the output signal of the detector via a signal converting circuit C, the design of which depends on the design of the pump or valve. If the unit P consists of a pump driven by a stepmotor, the circuit C consists of an amplitude to pulsefrequency converter. If the unit P consists for instance of a digital valve which could be set in two positions, the circuit C preferably consists of a pulse width modulator, i.e., a device generating pulses of a certain frequency, the duration of the pulses being determined by the amplitude of the signal from the detector. Thus if the amplitude of the detector signal has a certain initial value when the titration starts and has dropped to zero when the titration is terminated the valve might for instance be kept open continuously in the initial stage of the titration and then being opened for intervals of successively decreasing length and being continuously closed when the titration is terminated. If the adjustment of the interfacing circuit SF is correct, the liquid volume required for the titration will then be indicated in the counters R1, R2.

The apparatus according to FIG. 2 and FIG. 3 could of course also be used for diluting purposes for instance by registering the desired amount of liquid in a register in the counter and breaking the control signal when the value of the counter is identical to this registered value.

We claim:

1. In a liquid flow measuring system of the type wherein liquid flows through a conduit in increments of predetermined volume and wherein a flow control device is responsive to a control signal to vary the rate of flow of said increments of volume through a flow measuring instrument placed in series with said flow control device, said flow measuring instrument generating indicating signal pulses corresponding to the passage of said increments of volume through said measuring device, the method for increasing the measuring resolution of said flow measuring instrument which comprises the steps of connecting said flow measuring instrument in a circuit which includes first and second pulse counting circuits and an interfacing circuit, generating pulses with said interfacing circuit in response to said control signal at a frequency greater than the frequency of pulses generated by said flow measuring instrument and at a constant ratio with respect to the pulses generated by said flow measuring instrument, connecting said first pulse counting circuit to be responsive only to pulses generated by said flow measuring instrument, said second pulse counting circuit to be responsive to pulses generated by said flow measuring instrument and said interfacing circuit, and utilizing pulses counted by said first and second pulse counting circuits to represent the flow respectively of whole and fractional increments of said predetermined volume through said flow measuring instrument.

2. The method of claim 1 which includes the steps of repetitively counting the number of pulses generated by the interfacing circuit between successive pulses generated by the flow measuring instrument, and initiating each said repetitive counting concurrently with the generation of a pulse by the flow measuring instrument.

3. The method of claim 2 which includes the step of adjusting the frequency of the pulses generated by the interfacing circuit in proportion to changes in the frequency of pulses generated by the flow measuring instrument, whereby the representation of the flow of fractional amounts of said predetermined volume through said flow measuring instrument will be unaffected by changes in the rate of said flow.

* * * * *